(12) United States Patent
Nagao et al.

(10) Patent No.: US 8,688,242 B2
(45) Date of Patent: Apr. 1, 2014

(54) OPERATION CONTROLLING SYSTEM AND OPERATION CONTROLLING DEVICE AND METHOD

(75) Inventors: Hiroshi Nagao, Tokyo (JP); Hiroshi Murata, Tokyo (JP); Mitsuhiro Honda, Tokyo (JP); Masato Tanaka, Tokyo (JP); Mayumi Miura, Tokyo (JP)

(73) Assignee: Azbil Corporation, Tokyo (JP)

( * ) Notice: Subject to any disclaimer, the term of this patent is extended or adjusted under 35 U.S.C. 154(b) by 314 days.

(21) Appl. No.: 13/177,633

(22) Filed: Jul. 7, 2011

(65) Prior Publication Data

US 2012/0029658 A1 Feb. 2, 2012

(30) Foreign Application Priority Data

Jul. 29, 2010 (JP) .................................. 2010-170345

(51) Int. Cl.
*G05B 11/01* (2006.01)
(52) U.S. Cl.
USPC .............................. 700/12; 370/310; 710/244
(58) Field of Classification Search
USPC .............................. 700/12; 370/310; 710/244
See application file for complete search history.

(56) References Cited

U.S. PATENT DOCUMENTS

| | | | | |
|---|---|---|---|---|
| 2007/0285504 | A1* | 12/2007 | Hesse ......................... | 348/14.08 |
| 2007/0294450 | A1* | 12/2007 | Rudnick et al. .............. | 710/244 |
| 2008/0010641 | A1* | 1/2008 | Zhao et al. ................... | 718/101 |
| 2008/0197702 | A1* | 8/2008 | Banach ......................... | 307/11 |
| 2009/0034441 | A1* | 2/2009 | Budampati et al. .......... | 370/310 |
| 2009/0086692 | A1* | 4/2009 | Chen ............................ | 370/338 |

FOREIGN PATENT DOCUMENTS

| | | |
|---|---|---|
| JP | 2002-100484 A | 4/2002 |
| JP | 2002-299071 A | 10/2002 |
| JP | 2002-299075 A | 10/2002 |
| JP | 2003-308726 | 10/2003 |
| JP | 2005-158439 A | 6/2005 |
| JP | 2006-092917 | 4/2006 |
| JP | 2007-12331 A | 1/2007 |
| JP | 2010-033816 | 2/2010 |

OTHER PUBLICATIONS

Korean Office Action, dated Oct. 24, 2012, which issued during the prosecution of Korean Patent Application No. 10-2011-0054662, which corresponds to the present application.
Japanese Office Action, dated Nov. 26, 2013, which issued during the prosecution of Japanese Patent Application No. 2010-170345.

* cited by examiner

*Primary Examiner* — Mohammad Ali
*Assistant Examiner* — Anthony Whittington
(74) *Attorney, Agent, or Firm* — Troutman Sanders LLP

(57) ABSTRACT

An operation controlling system is provided with an operation controlling device that is installed removably in a facility equipment, and an operating terminal for sending an instruction signal to the operation controlling device. The operation controlling device not only has communicating means for receiving the instruction signal sent from the operating terminal, but also operation controlling means for turning ON/OFF, in accordance with the instruction signal, the facility equipment that is connected locally, and/or output controlling means for controlling, in accordance with the instruction signal, an output value of the facility equipment that is connected locally.

10 Claims, 15 Drawing Sheets

Prior Art

Prior Art

OPERATION CONTROLLING SYSTEM AND OPERATION CONTROLLING DEVICE AND METHOD

CROSS REFERENCE TO RELATED APPLICATIONS

The present application claims priority under 35 U.S.C. §119 to Japanese Patent Application No, 2010-470345, filed Jul. 29, 2010, which is incorporated herein by reference.

FIELD OF TECHNOLOGY

The present invention relates to an operation controlling system, and an operation controlling device and method, for controlling the operation of facility equipment such as lighting fixtures and air conditioning supply air vents, and the like.

BACKGROUND OF THE INVENTION

Conventionally, a plurality of facility equipment such as air conditioning supply air vents, lighting fixtures, and the like have been installed within large indoor spaces of buildings such as office buildings. The placements of the facility equipment are determined without regard to the intentions of the residents, prior to the residents determining the interior layout. These facility equipment are designed so that they can be grouped as appropriate, and turned ON/OFF separately for each separate zone.

Because the facility equipment are operated by the zone unit in this way, even if there were areas without any people within a particular zone, it would still not be possible to turn the air conditioning or the lighting OFF in that area, resulting in wasted energy. Given this, a technology has been proposed that makes it possible to adjust the lighting individually using a light-adjusting sensor device installed in the lighting fixture (See Japanese Unexamined Patent Application Publication 2007-12331 ("JP '331")). The technology disclosed in this JP '331 is one wherein lighting adjustment is controlled individually for each lighting fixture in accordance with the presence or absence of people and in accordance with the ambient lighting, through the provision of human presence sensors and illumination sensors in the light adjusting sensor equipment.

The design wherein the facility equipment are grouped appropriately is performed prior to the resident determining the interior layout, and thus is not likely to take into account convenience at the time of actual use.

The facility equipment are different from furnishings such as a desk or a chair that can be rearranged by the residents, but rather are secured to the ceiling or to the wall so cannot be rearranged at will after the interior layout has been established or modified.

The facility equipment are different from furnishings that can dedicated exclusively to the personal use of a resident, such as a desk or a chair, but rather are shared by a plurality of residents within the scope of the zone wherein there is grouping as appropriate, and thus it has not been possible to achieve an optimal state of use depending on the presence or absence of a resident.

Given the constraints, above, it is difficult to minimize the energy used while achieving the required indoor environment.

For example, when a grouping zone is actually designed to be shared by 10 people, where, in a zone, the lighting fixtures comprise eight lights, six air-conditioning vents are provided, and the lighting fixtures and the air conditioner vents are controlled as groups, even if there were only a single individual in the zone, due to some set of circumstances, still it would be necessary to maintain the indoor environment using the same amount of energy as if there were 10 people present. That is, for the lighting, all of the eight lights would be turned ON, consuming much more energy than is required for a single individual.

Moreover, as illustrated in the plan view in FIG. 15, for example, one may consider the provision of a large number of facility equipment 201 within the space 200 and dividing the space 200 into a plurality of zones 202 through 206. However, when a reception desk 207 is disposed so as to bridge across zones 202 and 203, then en if one wished to turn OFF the facility equipment 201 positioned at the reception desk 207, if there are people at the positions of 208 and 209, then the facility equipment 201 in zone 202 and zone 203 could not be turned off.

When designed from the start so as to be able to make the units smaller by partitioning to the degree that is possible for residents to use the facility equipment perfectly individually, then it is possible that the interior ends up partitioned with unnecessarily excessive fineness. Ultimately, this will result in the drawbacks that the usage decisions will be overly complex, and the equipment cost will be unnecessarily high.

Additionally, attempting to make the grouping units smaller after the fact would require changes in wiring, replacing equipment entirely, and the like, so the equipment renovation costs would be large.

In the technology disclosed in JP '331, lighting adjustment sensor devices 212 are provided on the individual lighting fixtures within the space 210, as illustrated in the plan view in FIG. 16, to enable the lighting adjustments of the lighting fixtures 211 to be controlled individually. However, in the technology disclosed in JP '331, it is assumed that the lighting adjustment sensor devices 212 are installed in every one of the lighting fixtures 211, and thus there is a problem in that this increases the equipment costs. Moreover, because the interior is partitioned for each of the lighting fixtures 211, there is a problem in that there is unnecessarily excessive partitioning within the interior. Furthermore, in the technology disclosed in JP '331 there is a problem in that the lighting adjustment sensor device 212 must be removed from the lighting fixture 211 and reinstalled when one wishes to change the operating mode.

The present invention is to solve the problem areas set forth above, and the object thereof is to provide an operation controlling system, and an operation controlling device and method, able not only to take into account the convenience of use when actually used after the interior layout has been determined by the resident, but also to enable the control of energy consumption.

SUMMARY OF THE INVENTION

An operation controlling system according to the present invention includes an operation controlling device that can be installed removably in a facility equipment; and an operating terminal for sending an instruction signal to the operation controlling device; wherein: the operation controlling device not only has communicating means for receiving the instruction signal sent from the operating terminal; but also includes operation controlling means for turning ON/OFF, in accordance with the instruction signal, a facility equipment that is connected locally and/or output controlling means for controlling, in accordance with the instruction signal, an output value of a facility equipment that is connected locally.

Additionally, in one composition example of an operation controlling system according to the present invention: the operation controlling device group setting means for grouping facility equipment in accordance with an instruction signal from the operating terminal or in accordance with the distance from the operating terminal; and the operation controlling means or the output controlling means control the facility equipment that is connected locally when an instruction signal for a group that includes the facility equipment that is connected locally is received.

Additionally, in one composition example of an operation controlling system according to the present invention: the operation controlling device a human presence detecting sensor for detecting the presence of a human; wherein the operation controlling means or output controlling means control, in accordance with a detection result of the human presence sensor, the facility equipment that is connected locally.

Additionally, in one composition example of an operation controlling system according to the present invention, the operation controlling device comprises notifying means for providing notification of an operating status of the facility equipment and/or a grouping status of the facility equipment.

Additionally, in one composition example of an operation controlling system according to the present invention, the facility equipment is a lighting fixture; and the operation controlling device further has a socket into which a light-emitting device can be installed, and a terminal that can connect to a socket of the lighting fixture when installed in the lighting fixture.

Moreover, the present invention is an operation controlling device that can be installed removably in a facility equipment, having not only communicating means for receiving the instruction signal sent from the operating terminal; but also operation controlling means for turning ON/OFF, in accordance with the instruction signal, a facility equipment that is connected locally and/or output controlling means for controlling, in accordance with the instruction signal, an output value of a facility equipment that is connected locally.

Additionally, one composition example of an operation controlling device according to the present invention includes group setting means for grouping facility equipment in accordance with an instruction signal from the operating terminal or in accordance with the distance from the operating terminal; and the operation controlling means or the output controlling means control the facility equipment that is connected locally when an instruction signal for a group that includes the facility equipment that is connected locally is received.

Additionally, one composition example of an operation controlling device according to the present invention includes a human presence detecting sensor for detecting the presence of a human; wherein the operation controlling means or output controlling means control, in accordance with a detection result of the human presence sensor, the facility equipment that is connected locally.

Additionally, one composition example of an operation controlling device according to the present invention has notifying means for providing notification of an operating status of the facility equipment and/or a grouping status of the facility equipment.

Additionally, one composition example of an operation controlling, device according to the present invention, if the facilities equipment is a lighting fixture, has a socket into which a light-emitting device can be installed, and a terminal that can connect to a socket of the lighting fixture when installed in the lighting fixture.

Additionally, an operation controlling method according to the present invention includes a step wherein an operation controlling device that can be installed removably into a facility equipment receives an instruction signal sent from an operating terminal; and an operation controlling step wherein the operation controlling device turns ON/OFF, in accordance with the instruction signal, a facility equipment that is connected locally and/or and output controlling step wherein the operation controlling device controls, in accordance with the instruction signal, an output value of a facility equipment that is connected locally.

In the present invention, an operation controlling device can be added easily only when needed, making it possible to control the ON/OFF state, and to control the output, of the facility equipment to which the operation controlling device has been added. Doing so makes it possible to achieve optimal states of use depending on the state of occupancy by the residents, independently of the grouping of the facility equipment at the time of design, thus making it possible to minimize the energy used while achieving the required interior environment. Additionally, in the present invention, the convenience at the time of actual use can be taking into consideration after the residents have determined the interior layout, thereby making it possible to improve the convenience for the residents. Furthermore, in the present invention there is no need to make the grouping units within the interior be excessively fine, nor is there that need to modify wiring or to change facility equipment, thus making it possible to minimize increased costs. Additionally, the builder is able to reduce the need for the expenditure of large amounts of time and money researching the grouping that would reduce complaints from the users (the residents). Additionally, in the present invention it is possible to send instruction signals to the operation controlling devices from an operating terminal, thereby enabling increases in convenience for the residents and the administrators.

In the present invention, a plurality of facility equipment can be grouped enabling ON/OFF control and output control of a plurality of facility equipment all at once.

Additionally, in the present invention a human presence sensor may be provided in the operation controlling device to enable the achievement of control of the facility equipment depending on whether or not people are present.

Additionally, in the present invention the provision of notifying means for providing notification of the status of operation of the facility equipment, and of the status of grouping of the facility equipment, to the operation controlling device makes it possible for the residents within the space or the administrator to confirm easily the status of the operation of the facility equipment and the status of grouping of the facility equipment.

Furthermore, in the present invention the provision, in the operation controlling device, of a socket in which the lighting fixture can be installed, and the provision of a terminal that attaches to the socket of the lighting fixture when installed in the lighting fixture, enables the sockets of existing lighting fixtures to be used, and enables the addition of the operation controlling devices to the lighting fixtures.

BRIEF DESCRIPTIONS OF THE DRAWINGS

Figure 6:
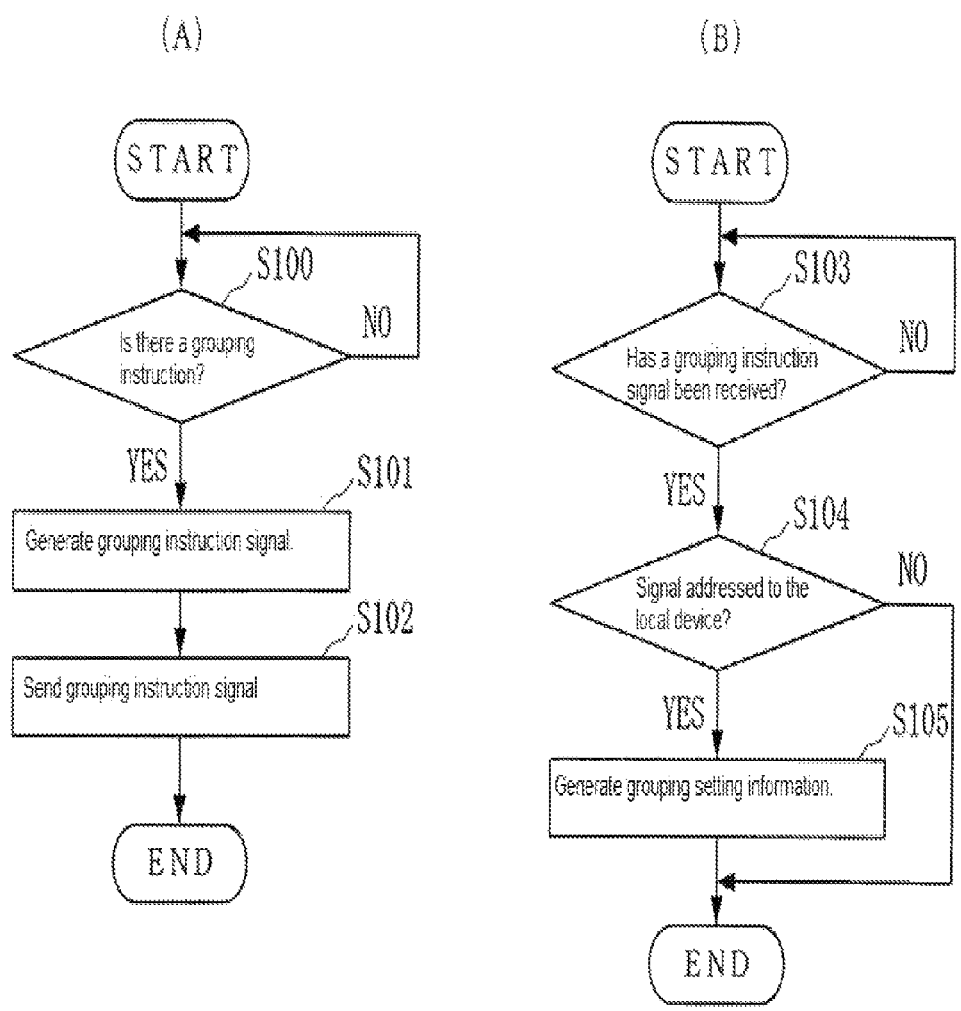

FIGS. 6 (a) and 6 (b) are flowcharts illustrating the operation of an operating terminal and an operation controlling device in the case of grouping of facility equipment in the example according to the present invention.

Figure 7:
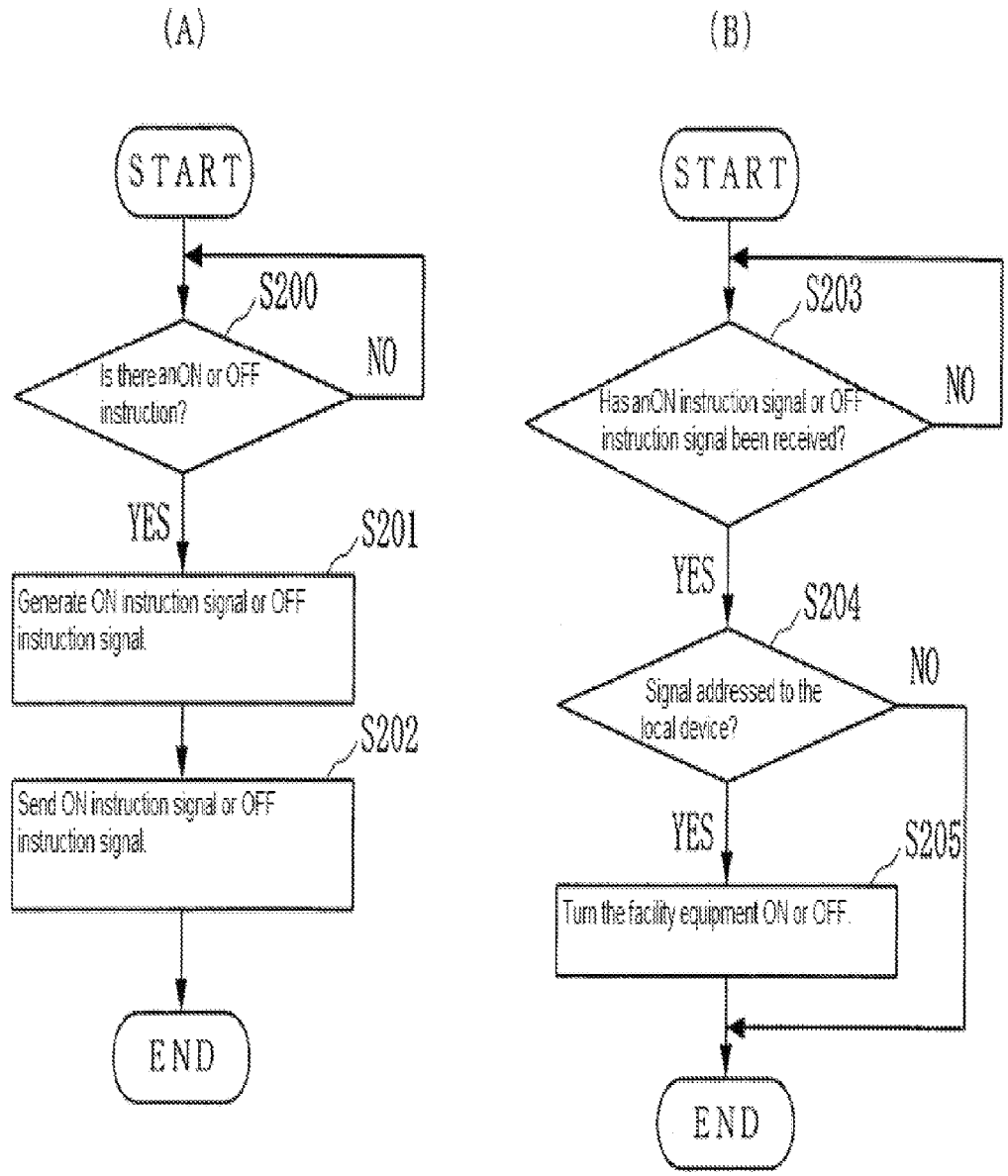

FIGS. 7 (a) and 7 (b) are flowcharts illustrating the operation of an operating terminal and an operation controlling device in the case of turning ON/OFF facility equipment in the example according to the present invention.

Figure 8:
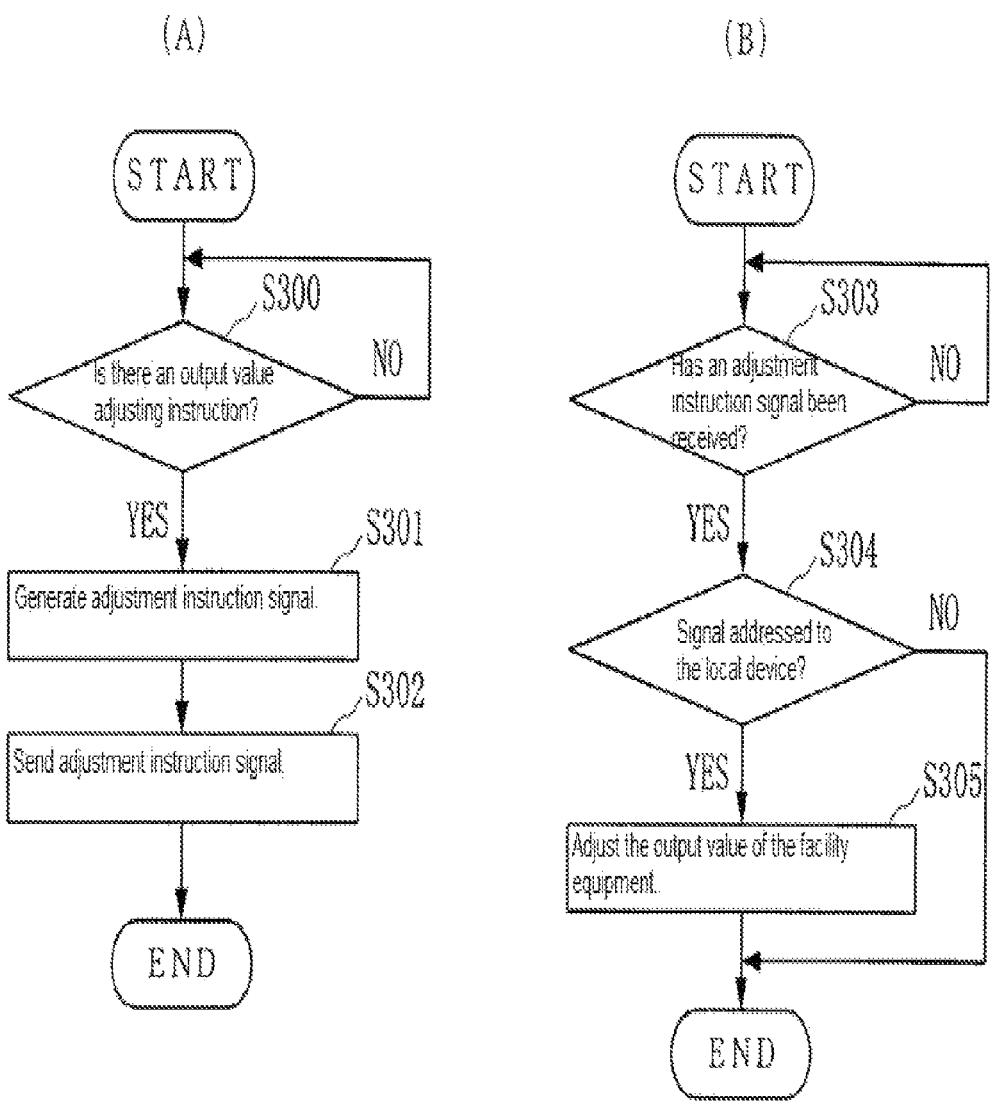

FIGS. 8 (a) and 8 (b) are flowcharts illustrating the operation of an operating terminal and an operation controlling device in the case of controlling the output of facility equipment in the example.

Figure 9:
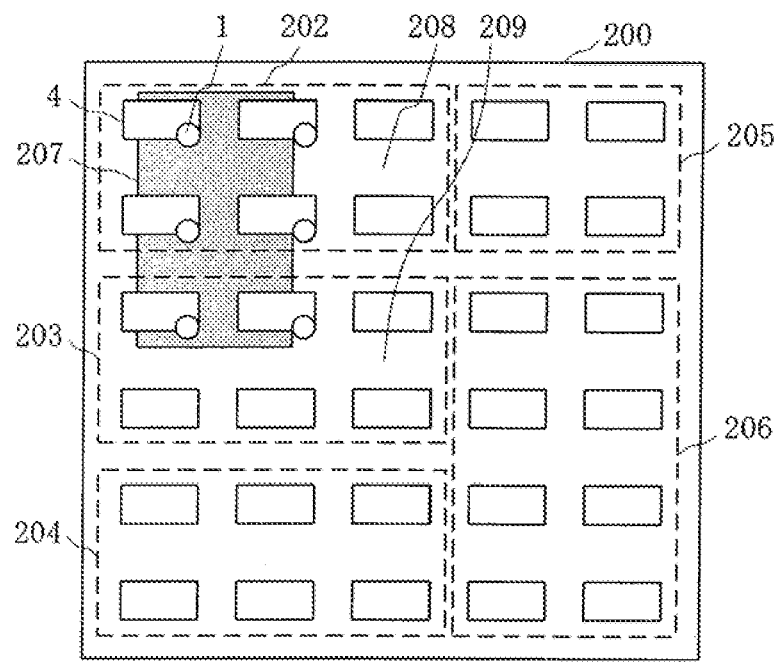

FIG. 9 is a plan view for explaining the effects of an operation controlling system as set forth in the present invention.

Figure 10:
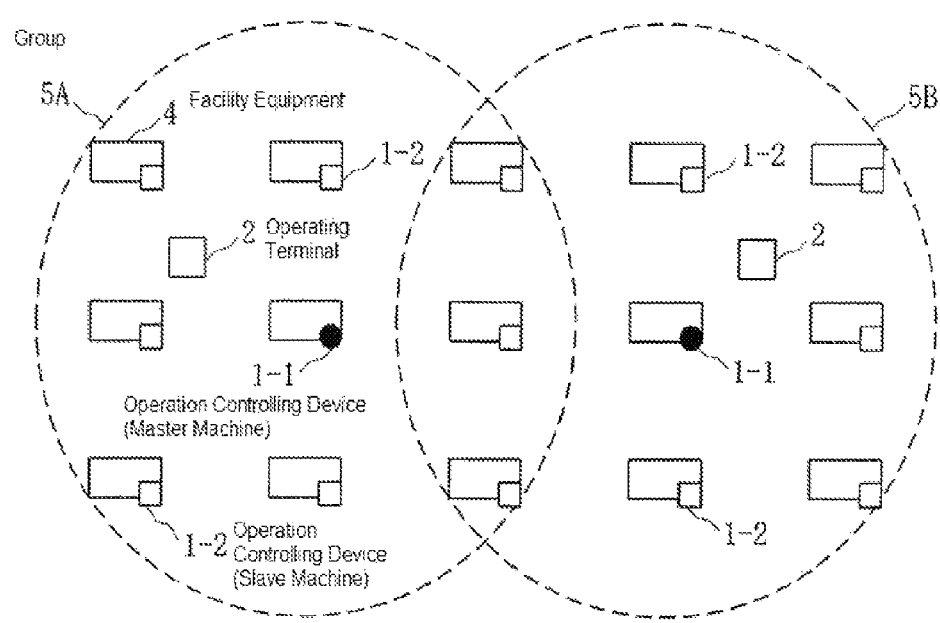

FIG. 10 is a plan view illustrating the structure of an operation controlling system as set forth in another example according to the present invention.

Figure 11:
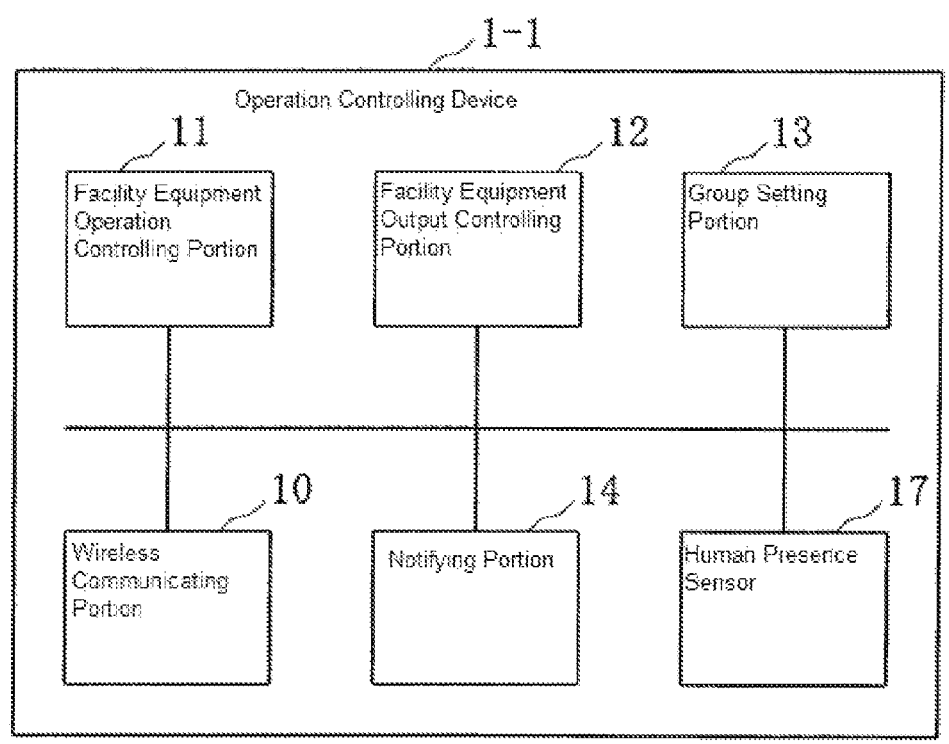

FIG. 11 is a block diagram illustrating the structure of a master machine of the operation controlling system as set forth in the other example.

Figure 12:
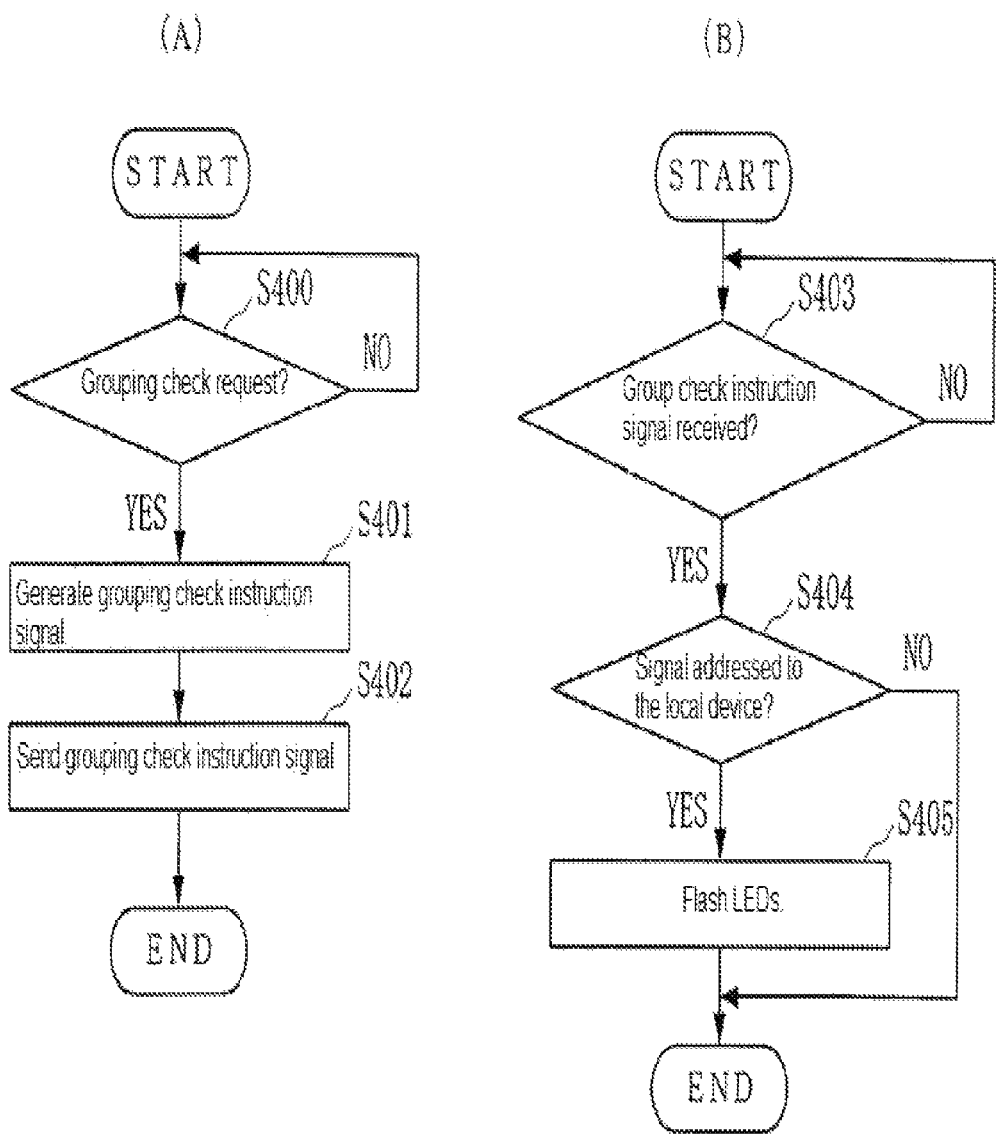

FIGS. 12 (a) and 12 (b) are flowcharts illustrating the operation of an operating terminal and an operation controlling device when checking the state of grouping of facility equipment in a further example according to the present invention.

Figure 13:
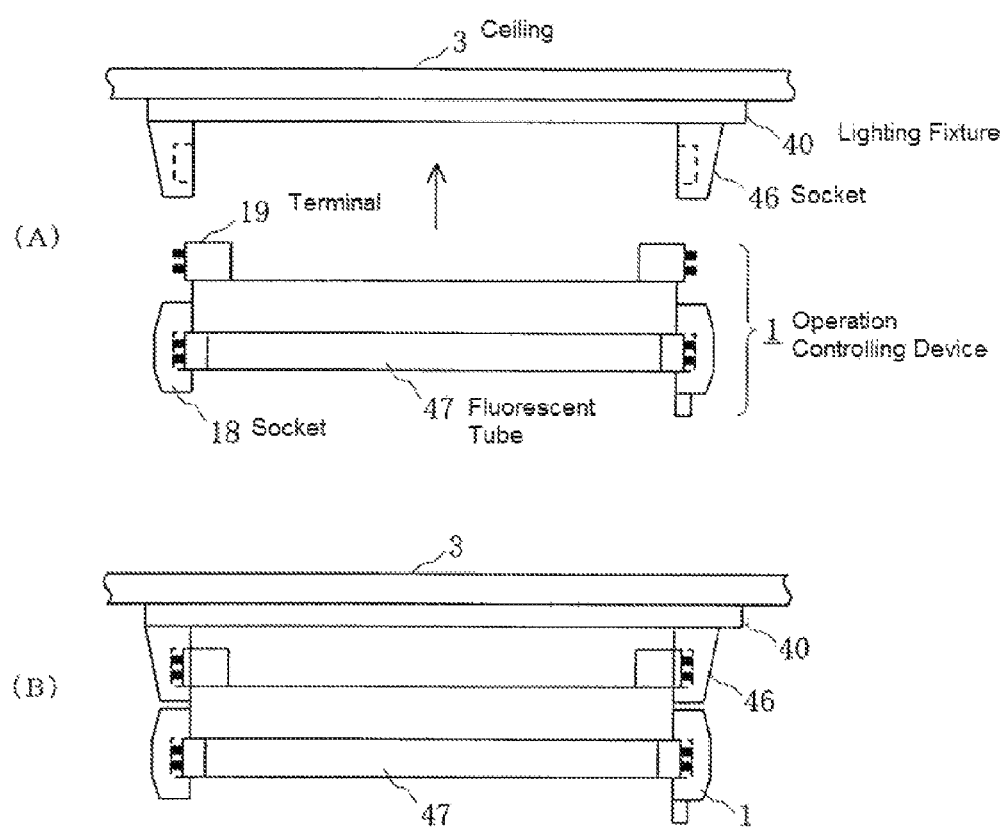

FIG. 13 is a block diagram illustrating the structure of an operation controlling of the operation controlling system as set forth in yet another example.

Figure 14:
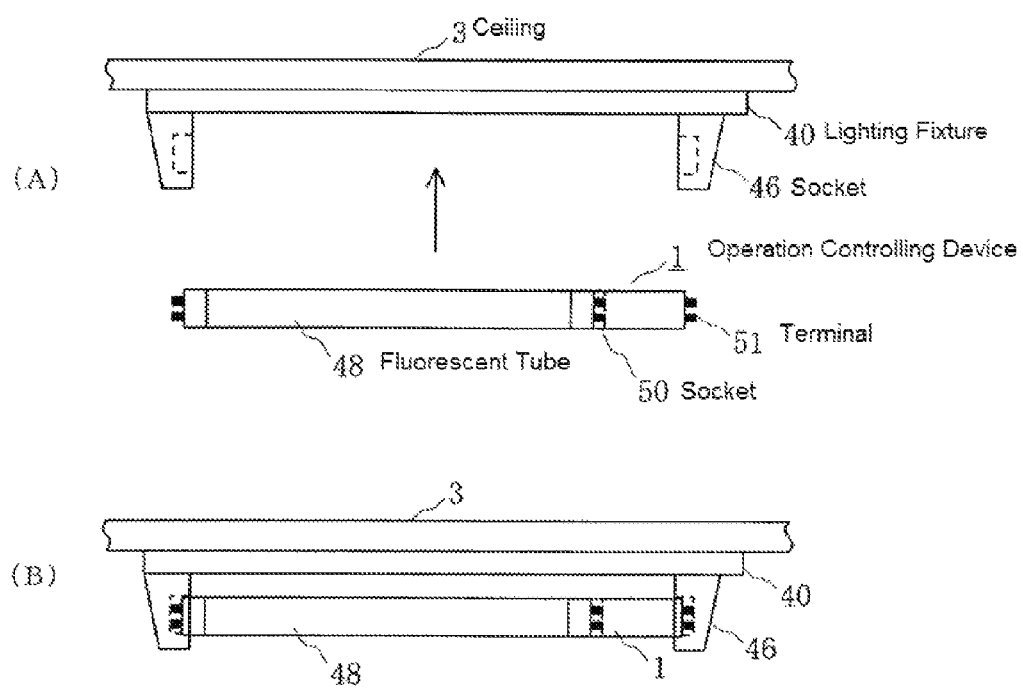

FIG. 14 is a block diagram illustrating another structure of an operation controlling of the operation controlling system as set forth in the example according to the present invention.

Figure 15:
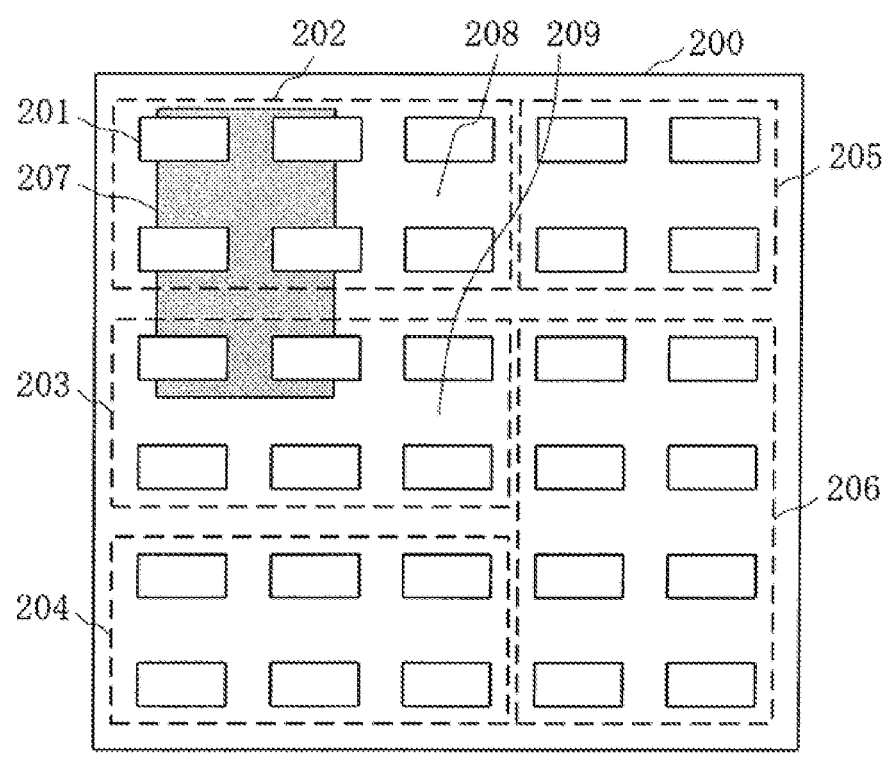

FIG. 15 is a plan view for explaining the conventional problem areas.

Figure 16:
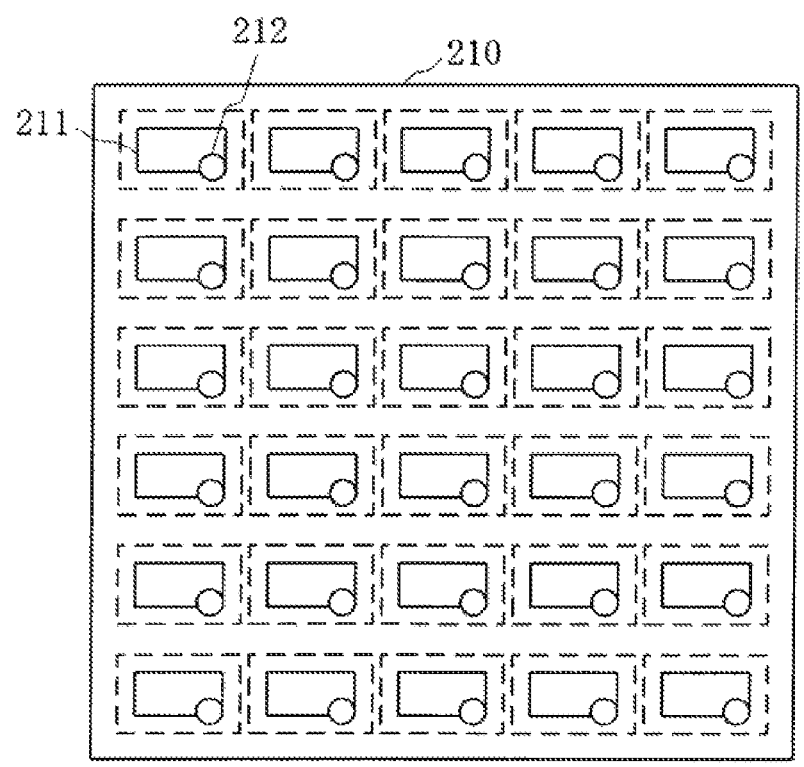

FIG. 16 is a plan view for explaining another conventional problem area.

DETAILED DESCRIPTION OF THE INVENTION

It is necessary to install air conditioning and lighting linked to the functional structural elements of the building itself, such as providing power to the lighting and to the conditioned air circulation in air conditioning, and thus these must be handled as building functions, and the installation of facility equipment must be performed at the time of construction. That is, facility equipment such as air conditioner supply air vents and lighting fixtures inherently have the nature of "stationary object=should be stationary", and such characteristic is unavoidable.

On the other hand, in contrast to facilities that are used over short periods of time in specific locations, such as water and gas facilities, air conditioning supply air vents and lighting fixtures are used over broad areas for extended periods of time, and thus the desired optimal state thereof will change, as appropriate, depending on the state within the interior. That is, the facility equipment, such as air conditioning supply air vents and lighting fixtures, and the like, also have the nature of "non-stationary object=should not be stationary."

The inventors noticed that in the occurrence of the problems described above that, conventionally, in facility equipment such as air conditioning supply air vents and lighting fixtures, their nature as "stationary objects" has been emphasized, sacrificing their nature as "non-stationary objects." Based on this observation, the inventors arrived at the use of a structure that separates the portion that is unavoidably a "stationary object" from the portion that would be better handled as a "non-stationary object," to arrive at the present invention.

Specifically, the main units of the facility equipment such as air conditioning supply air vents and lighting fixtures are installed as has been done conventionally, and those operating functions required to enable the resident exclusive use or appropriate grouping depending on the layout are structured so as to be installable/removable in the main units. For example, an operation controlling device is used for receiving instruction signals wirelessly from the residents, and for issuing, to the main units, control signals for changing the status of the air-conditioning or the lighting.

The main unit of an air conditioning supply air vent or a lighting fixture is structured having an securing portion to enable installation and removal of the operation controlling device. In this case, the main unit corresponds to the "stationary object," and the operation controlling device corresponds to the "non-stationary object." The user is able to install the operation controlling devices in only those locations wherein they are needed, and can change the installation locations if operations change, thereby responding flexibly to changes in layout, and the like.

While the lighting adjustment sensor device disclosed in JP '331 can also be installed removably, it cannot receive instruction signals wirelessly, such as in the operation controlling device according to the present invention, and requires removal from the main unit in order to reset the operating mode, and thus flexible operation is not possible. Additionally, in the present invention, there is a grouping function, for grouping a plurality of facility equipment, in the operation controlling device, in order to further increase the flexibility of operation.

Figure 1:
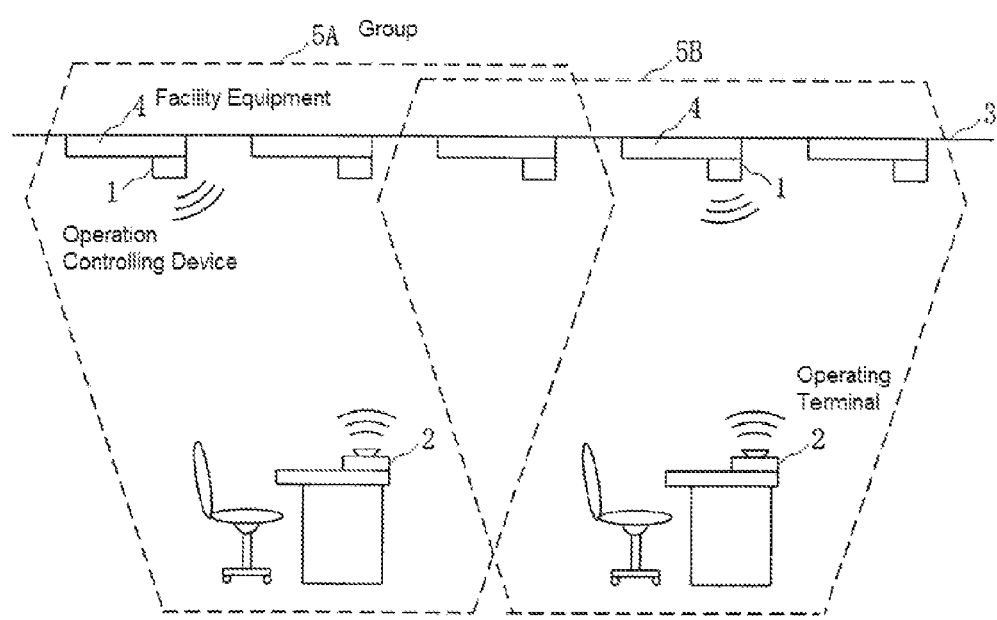
FIG. 1 is a diagram illustrating the structure of an operation controlling system as set forth in an example according to the present invention.

Forms for carrying out the present invention are explained below in reference to the figures. FIG. 1 is a diagram illustrating the structure of an operation controlling system as set forth in an example. The operation controlling system is structured from an operation controlling device 1 that is installed removably to a facility equipment 4, such as an air conditioning supply air vent or a lighting fixture, or the like, installed in the ceiling 3 within the interior space, and an operating terminal 2 for sending instruction signals wirelessly to the operation controlling device 1.

Figure 2:
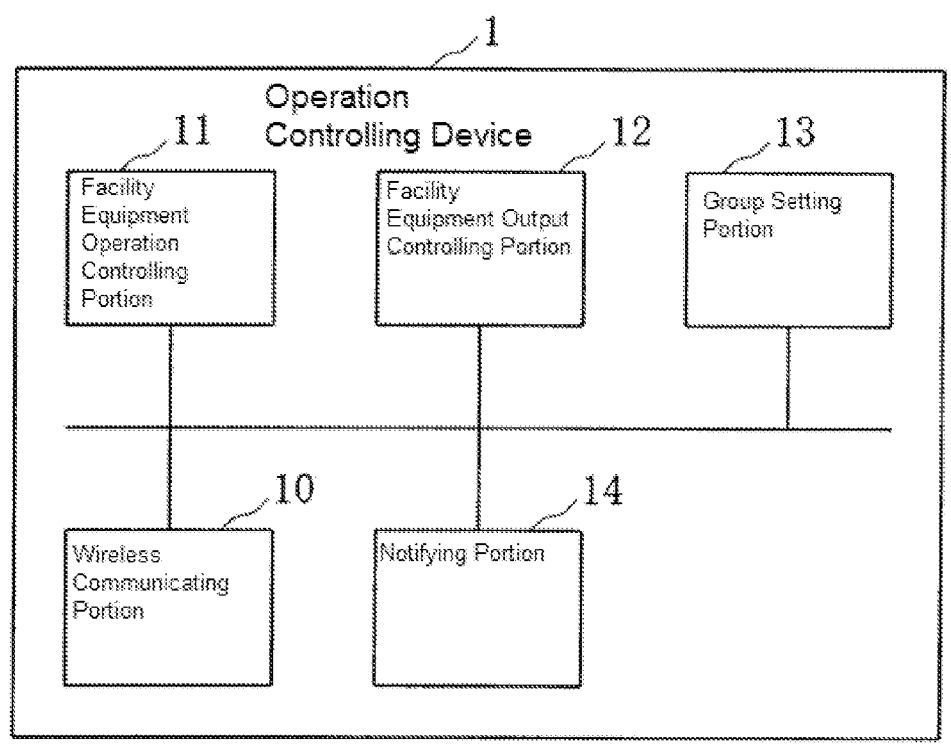
FIG. 2 is a block diagram illustrating the structure of an operation controlling of the operation controlling system as set forth in the example.

FIG. 2 is a block diagram illustrating a configuration of an operation controlling device 1. The operation controlling device 1 includes a wireless communicating portion 10 for not only receiving an instruction signal that is sent wirelessly from an operating terminal 2 but also for communicating wirelessly with other operation controlling devices 1; a facility equipment operation controlling portion 11 for controlling the facility equipment 4, connected locally, in response to an ON/OFF instruction signal; a facility equipment output controlling portion 12 for controlling an output value of a facility equipment 4, connected locally, in response to an instruction signal; a group setting portion 13 for grouping facility equipment 4; and a notifying portion 14 for providing notification to a resident or an administrator, or the like, of the state of operation of the facility equipment 4, the state of grouping of the facility equipment 4, or the like. Here if the facility equipment 4 is, for example, an air conditioning supply air vent, then the facility equipment operation controlling portion 11 and the facility equipment output controlling portion 12 are, for example, motorized dampers. The supply air flow is put into an OFF state through fully closing the motorized damper, and the output of the supply air flow can be changed by changing, proportionately or step-wise, the degree of opening of the motorized damper. Moreover, if the facility equipment 4 is, for example, a lighting fixture, then the output value of the facility equipment 4 is the amount of light. The facility equipment operating controlling portion 11 is, for example, an ON/OFF point relay, and the facility equipment output controlling portion 12 is a signal outputting device that indicates the state of the amount of lighting, or a frequency converting device for adjusting the amount of lighting.

Figure 3:
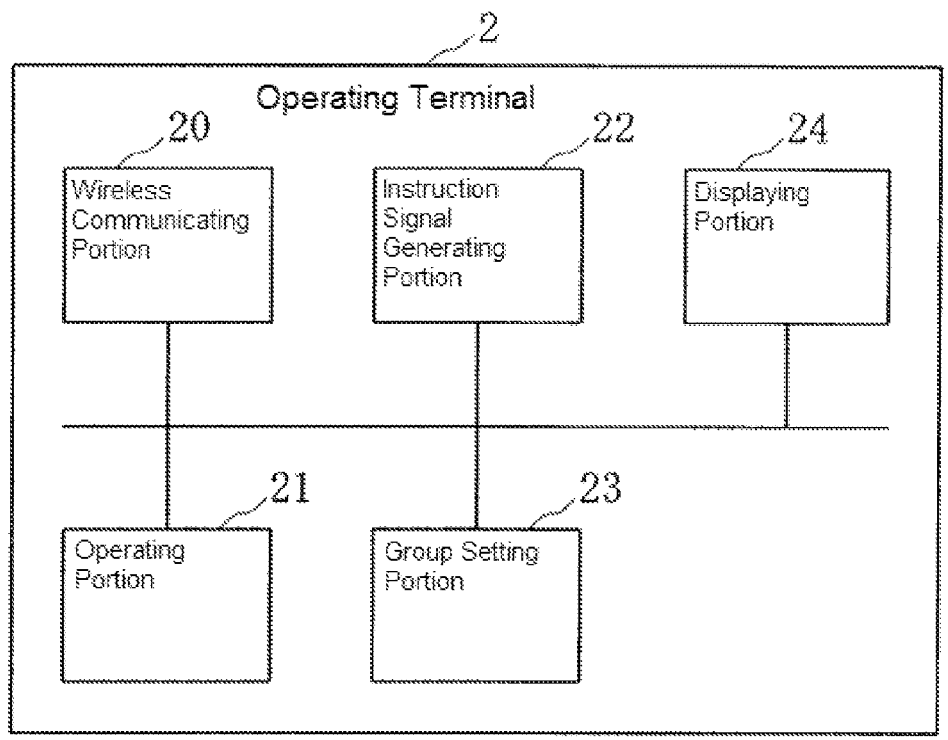
FIG. 3 is a block diagram illustrating the structure of an operating terminal of the operation controlling system as set forth in the example.

FIG. 3 is a block diagram illustrating a configuration of an operating terminal 2. The operating terminal 2 has a wireless communicating portion 20 for sending an instruction signal wirelessly to the operation controlling device 1; an operating portion 21 for receiving instructions from a resident or an administrator; an instruction signal generating portion 22 for generating an instruction signal in accordance with an operation by a resident or an administrator; a group setting portion 23 for including the operating terminal 2 into a specific group; and a displaying portion 24 for displaying information to the resident or the administrator.

Figure 4:
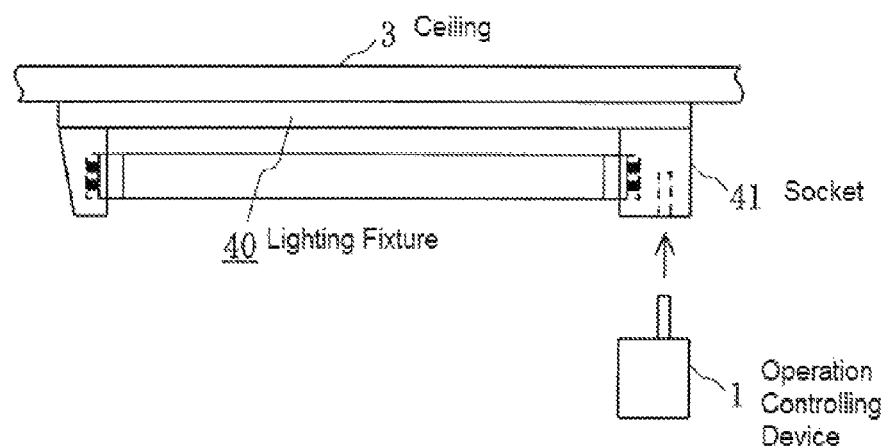
FIG. 4 is a block diagram illustrating a lighting fixture that is one example of a facility equipment in the example according to the present invention.

FIG. 4 is a diagram illustrating a configuration for a lighting fixture that is one example of a facility equipment 4. In the lighting fixture 40, an installable operation controlling device installing portion 41 is equipped removably with an operation controlling device 1. When the operation controlling device 1 is installed in the operation controlling device installing portion 41, a power supply terminal (not shown) provided in the operation controlling device installing portion 41 and a power supply terminal (not shown) of the operation controlling device 1 are connected, and a communication terminal (not shown) provided in the operation controlling device installing portion 41 and a communication terminal (not shown) in the operation controlling device 1 are connected. In this way, the operation controlling device 1 operates through receiving power supplied from the lighting fixture 40, and is able to perform ON (illuminated)/OFF (dark) control, and lighting adjustment control of the lighting fixture 40 through switching the wiring within the equipment, between the socket wherein a fluorescent tube is installed and the ballast, so that the socket and the operation controlling device 1 are connected. Conversely, other wiring for controlling the ballast of the lighting fixture 40 may be included in advance in the lighting fixture 40, and the operation controlling, device 1 because that wiring to be connected.

Note that while in the present example, the operation controlling device 1 is installed removably in an operation controlling device installing portion 41 to turn the lighting ON (illuminated)/OFF (dark) or to control the lighting adjustment, other forms may be used instead insofar as there are mechanisms able to control the amount of light. For example, a socket that incorporates the function of the operation controlling device may replace an existing socket. Conversely, the function of an operation controlling device may be included in a ballast which may replace an existing lighting ballast. Moreover, an operation controlling device may be provided in the wiring of the socket and the ballast. Note that in that which is listed here there are cases which involve simple wiring work within the equipment, but work on the power supply wiring to the lighting fixture is not necessary, and the work involved in the wiring work is less than that in a conventional systems, and there are substantial economic benefits.

Figure 5:
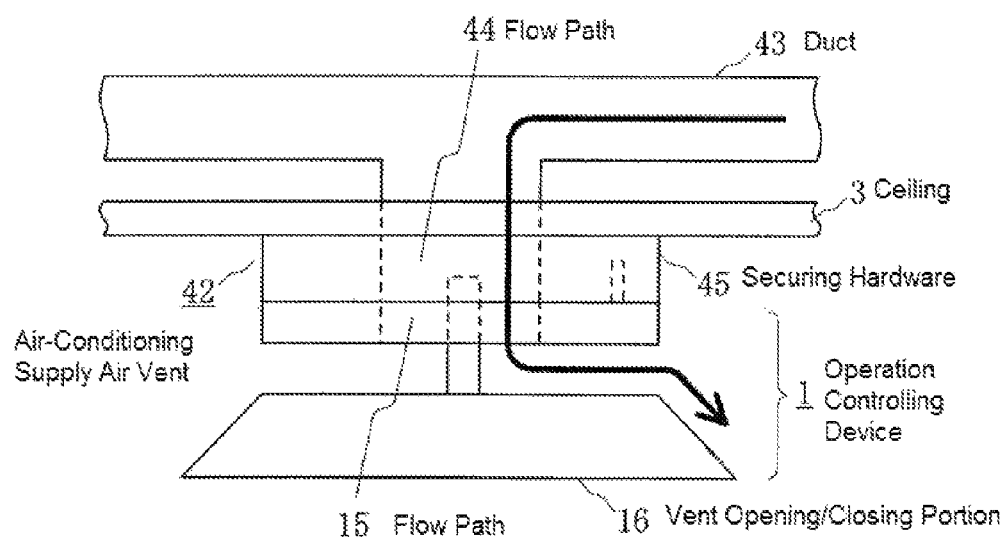
FIG. 5 is a block diagram illustrating an air conditioning supply air vent that is one example of a facility equipment in the example.

FIG. 5 is a block diagram illustrating a configuration for an air conditioning supply air vent that is one example of a facility equipment 4. The air conditioning supply air vent 42 is provided with a flow path 44 through which flows the air that is provided from a duct 43, and securing hardware 45 wherein the operation controlling device 1 can be installed removably. When the operation controlling device 1 is installed in the air conditioning supply air vent 42, it has a flow path 15 through which air is supplied, and a vent opening/closing portion 16, for controlling the amount of airflow, as a structure that is a portion of the air conditioning supply air vent 42.

When the operation controlling device 1 is installed in the securing hardware 45, a power supply terminal (not shown) that is provided in the air conditioning supply air vent 42 and a power supply terminal (not shown) of the operation controlling device 1 are connected. In this way, the operation controlling device 1 operates by receiving a power supply from the air conditioning supply air vent 42. Moreover, the air that is supplied from the duct 43 passes through the flow paths 44 and 15, to be fed into the interior space from an opening portion made by the vent opening/closing portion 16.

At this time, the facility equipment operation controlling portion 11 of the operation controlling device 1 and the facility equipment output controlling portion 12 are able to increase and decrease the flow rate of the supply air through changing the magnitude of the opening portion by moving the vent opening/closing portion 16 upward and downward, to set the supply air flow rate to any given flow rate between 0% (OFF) to 100%. In this way, the operation controlling device 1 is able to turn the supply air ON/OFF, or to perform air supply flow rate control. Note that while in the present form of embodiment the control of the air flow rate is performed by moving the vent opening/closing portion 16 up and down, there is no limitation thereto, and any mechanism may be used insofar as it is able to control all the air flow rate. For example, an air flow rate controlling mechanism such as a motorized damper may be installed in a duct that leads to the vent.

An operation controlling system according to the present example is explained next in greater detail. FIG. 6 (A) and FIG. 6 (B) are flow charts illustrating the operation in the case of grouping of the facility equipment 4, where FIG. 6 (A) is a flowchart illustrating the operation of the operating terminal 2 and FIG. 6 (B) is a flowchart illustrating the operation of the operation controlling device 1.

When a resident or an administrator of the interior space wishes to group facility equipment 4, he or she operates the operating portion 21 of the operating terminal 2 to specify the facility equipment 4 to be grouped. The resident or administrator may specify the facility equipment 4 to be grouped by, for example, specifying using identification numbers that are assigned in advance to the facility equipment 4.

The instruction signal generating portion 22 of the operating terminal 2, upon sensing that there has been a grouping instruction from a resident or an administrator (FIG. 6 (A) Step S100: YES) generates a grouping instruction signal for grouping the specified facility equipment 4 (Step S101). The grouping instruction signal includes, for example, information specifying the facility equipment 4 and group identification information. The wireless communicating portion 20 of the operating terminal 2 wirelessly sends the grouping instruction signal, generated by the instruction signal generating portion 22, to each of the operation controlling devices 1 (Step S102).

When the wireless communicating portion 10 in each of the operation controlling devices 1 receives a grouping instruction signal from the operating terminal 2 (FIG. 6(B) Step S103: YES), the grouping instruction signal is passed to the group setting portion 13. When the grouping instruction signal received is a grouping instruction signal for the facility equipment 4 connected locally, the group setting portion 13 recognizes the signal as a signal to the local device (Step S104: YES), and generates and stores in memory grouping setting information indicating that the device belongs to the group that is specified in the group identifying information of the grouping instruction signal (Step S105).

In this way, the facility equipment 4 specified by the resident or the administrator are grouped to belong to a specific group. In the example in FIG. 1, two groups, group 5A and group 5B, are set up.

Note that when one wishes to associate the operating terminal 2 with a specific group, the resident or administrator operates the operating portion 21 of the operating terminal 2 to specify the correspondence with the particular group. The group setting portion 23 of the operating terminal 2 generates and stores in memory grouping setting information indicating that the local device is a device corresponding to a specific group, in response to the instruction from the resident or the administrator. Thereafter, the operating terminal 2 is a device for operating only the specific group.

FIG. 7(A) and FIG. 7(B) are flow charts illustrating the operations when turning the facility equipment 4 ON and OFF, where FIG. 7(A) is a flowchart illustrating the operation of the operating terminal 2 and FIG. 7(B) is a flowchart illustrating the operation of the operation controlling device 1. When a resident or an administrator of the space wishes to turn the facility equipment 4 of a specific group ON or OFF, he or she operates the operating portion 21 of the operating terminal 2 to specify the group to be turned ON or OFF. The resident or administrator may specify the group to be turned ON or OFF through specifying, for example, a specification number that has beery assigned to the group. Moreover, the resident or administrator may instead operate a specific operating terminal 2 that corresponds to the group to be turned ON or OFF.

When the instruction signal generating portion 22 of the operating terminal 2 senses that there is an instruction for turning ON or OFF from a resident or an administrator (FIG. 7(A) Step S200: YES), it generates an ON instruction signal for turning ON the facility equipment 4 in the group specified by the resident or administrator, or an OFF instruction signal for turning OFF the facility equipment 4 of the specified group (Step S201). If the operating terminal 2 is associated with a specific group, then the instruction signal generating portion 22 may generate an ON instruction signal for turning ON the facility equipment 4 of the corresponding group, or an OFF instruction signal for turning OFF the facility equipment 4 of the corresponding group. The ON instruction signal or OFF instruction signal includes, for example, group identification information for identifying the specified group. The wireless communicating portion 20 of the operating terminal 2 wirelessly sends, to each operation controlling device 1, the ON instruction signal or OFF instruction signal generated by the instruction signal generating portion 22 (Step S202).

When the wireless communicating portion 10 of each operation controlling device 1 receives the ON instruction signal or the OFF instruction signal from the operating terminal 2 (FIG. 7(B) Step S203: YES), it passes the ON instruction signal or OFF instruction signal to the facility equipment operation controlling portion 11. If the ON instruction signal or OFF instruction signal that has been received is a signal instructing ON or OFF of a group including the facility equipment 4 that is connected locally, then the facility equipment operation controlling portion 11 identifies the signal as a signal to the local device (Step S204: YES), and, in accordance with the ON instruction signal or OFF instruction signal, turns ON or OFF the facility equipment 4 that is connected locally (Step S205). Whether or not the ON instruction signal or OFF instruction signal is a signal for instructing ON/OFF of a group that includes the facility equipment 4 connected locally can be evaluated by comparing the group identification information included in the ON instruction signal or OFF instruction signal to the group setting information set in the group setting portion 13.

In this way, it is possible to turn ON/OFT only those facility equipment 4 of the specific group. Note that if the facility equipment 4 belongs to a plurality of groups, then the operation may be through an overall evaluation of signals pertaining to a plurality of groups. That is, if the facility equipment operation controlling portion 11 of the operation controlling device 1 receives an ON instruction signal for at least one of the plurality of groups to which the facility equipment 4 connected locally belongs, then the facility equipment operation controlling portion 11 turns ON the facility equipment 4 that is connected locally. Moreover, when the facility equipment operation controlling portion 11 receives an OFF instruction signal for all of the groups to which the facility equipment 4 connected locally belongs, then the facility equipment operation controlling portion 11 turns OFF the facility equipment 4 that is connected locally.

FIG. 8 (A) and FIG. 8 (B) are flow charts illustrating the operations when performing output control of facility equipment 4, where FIG. 8 (A) is a flowchart illustrating the operation of the operating terminal 2 and FIG. 8 (B) is a flowchart illustrating the operation of the operation controlling device 1. When a resident or an administrator of the space wishes to control the output of the facility equipment 4 of a specific group, he or she operates the operating portion 21 of the operating terminal 2 to specify the group to be adjusted. The resident or administrator may specify the group to be adjusted through specifying, for example, a specification number that has been assigned to the group. Moreover, the resident or administrator may instead operate a specific operating terminal 2 that corresponds to the group to be adjusted.

At this time, the resident or administrator may specify merely the increasing/decreasing direction of the output value to be adjusted, or may specify specifically the amount of increase or decrease of the output value to be adjusted. If only the direction of increase/decrease of the output value is specified, then if the facility equipment 4 is a lighting fixture, then the result is an instruction to increase the amount of light or decrease the amount of light, but if the facility equipment 4 is an air conditioning supply air vent, then the instruction is to increase the amount of airflow or decrease the amount of airflow. Moreover, if the instruction is to increase or decrease the amount of an output value, then if the facility equipment 4 is a lighting fixture, then the instruction will be an amount of increase (%) in the amount of lighting or an amount of decrease (%) in the amount of lighting, but if the facility equipment 4 is and air conditioning supply air vent, then the instruction will be an amount of increase (%) in the amount of airflow or an amount of decrease (%) in the amount of airflow.

When the instruction signal generating portion 22 of the operating terminal 2 senses that there is an instruction for adjusting an output value from a resident or an administrator (FIG. 8 (A) Step S300: YES), it generates an adjustment instruction signal for adjusting the output value of the facility equipment 4 in the group specified by the resident or administrator (Step S301). If the operating terminal 2 is associated with a specific group, then the instruction signal generating portion 22 may generate an adjustment instruction signal for adjusting the output value of the facility equipment 4 of the corresponding group. The adjustment instruction signal includes, for example, group identification information for specifying the group and increase/decrease direction information for specifying the direction of increasing or decreasing the output value. Moreover, if the amount of increase or decrease of the output value is specified by a resident or an administrator, the increase/decrease the amount information is also included in the adjustment instruction signal. The wireless communicating portion 20 of the operating terminal 2 wirelessly sends the adjustment instruction signal to each operation controlling device 1 (Step S302).

When the wireless communicating portion 10 of each operation controlling device 1 receives the adjustment instruction signal from the operating terminal 2 (FIG. 8 (B) Step S303: YES), it passes the adjustment instruction signal to the facility equipment output controlling portion 12. If the adjustment instruction signal that has been received is an adjustment signal instructing an adjustment to a group including the facility equipment 4 that is connected locally, then the facility equipment output controlling portion identifies the signal as a signal to the local device (Step S304: YES), and adjusts the output value of the facility equipment 4 that is connected locally in accordance with the adjustment instruction (Step S305). Whether or not the adjustment instruction signal is a signal for instructing the output value adjustment of a group that includes the facility equipment 4 connected locally can be evaluated by comparing the group identification information included in the adjustment instruction signal to the group setting information set in the group setting portion 13.

If the adjustment instruction signal does not include increase/decrease amount information, then the facility equipment output controlling portion 12 may increase or decrease the output value of the facility equipment 4 by a specific amount in accordance with the increase/decrease direction information in the adjustment instruction signal. Additionally, if the adjustment instruction signal includes the increase/decrease amount information, then the facility equipment output controlling portion 12 increases or decreases the output value of the facility equipment 4 by the amount specified by the increase/decrease amount information.

In this way, it is possible to control the output of only the facility equipment 4 of the specific group. Note that if the facility equipment 4 belongs to a plurality of groups, then the operation may be through an overall evaluation of signals pertaining to a plurality of groups. That is, if an adjustment instruction signal for a plurality of groups including the facility equipment 4 connected locally is received, the facility equipment output controlling portion 12 of the operation controlling device 1 uses the maximum value, average value, weighted average value, or minimum value specified for the increase/decrease amount information for each of the groups to determine the amount of increase/decrease, to adjust the output value of the facility equipment 4 connected locally.

Moreover, when an adjustment instruction signal for a plurality of groups containing the facility equipment 4 that is connected locally is received, then if the increase/decrease amount information is not included in the adjustment instruction signal, the facility equipment output controlling portion 12 either determines the direction of increase/decrease in accordance with one of the increase/decrease direction information in the individual groups, or determines the increase/decrease direction by determining the increase/decrease direction that occurs most often within each of the groups, and adjusts the output value of the facility equipment 4 that is connected locally.

As described above, in the present example, the operation controlling device 1 is added simply to only the locations wherein it is required, enabling the facility equipment 4 to which the operation controlling device 1 has been added to be turned ON/OFF, or the output thereof to be controlled. The present example enables the achievement an optimal state of use depending on the state of occupancy by the resident regardless of the grouping of the facility equipment 4 at the time of design, thus enabling energy use to be minimize while achieving the required interior environment. Moreover, the present example is able to take into consideration the convenience in actual use, after the residents have determined the layout within the space, thus making it possible to increase the convenience for the residents.

Moreover, in the present example there is no need for excessively fine division of the grouping units within the space, nor is it necessary to modify the wiring or to replace the facility equipment 4, thus making it possible to minimize increases in costs. Additionally, the builder is able to reduce the need for the expenditure of large amounts of time and money researching the grouping that would reduce complaints from the users (the residents). Additionally, the present example enables the sending of the instruction signals from the operating terminal 2 to the operation controlling devices 1 wirelessly, thus enabling further increases in convenience for the residents and the administrators. Furthermore, the present example enables a plurality of facility equipment 4 to be turned ON/OFF, or the output thereof to be adjusted, as a group through grouping a plurality of facility equipment 4.

Moreover, as illustrated in the plan view in FIG. 9, a large number of facility equipment 4 is equipped within the space 200, and a case wherein the space 200 is grouped in advance into a plurality of zones 202-206 is contemplated. As with the case in FIG. 15, when a reception desk 207 is provided so as to cross between zones 202 and 203, installing operation controlling devices 1 into the six facility equipment 4 positioned at the reception desk 207 and then grouping them together makes it possible to turn OFF only the six facility equipment 4 that are positioned at the reception desk 207 all at once, through a single operation, when there is no one at the reception desk 207, regardless of the occupancy of people in zones 202 and 203. Consequently, the residents are able to perform energy conservation activities in terms of turning OFF the lights without any particular hesitation.

Another example according to the present invention is explained next. While in the above example the grouping of the facility equipment 4 was performed in accordance with instructions from a resident or an administrator, the grouping may instead be performed automatically.

For example, the group setting portion 13 of each individual operation controlling device 1 may perform grouping of the facility equipment 4 connected locally automatically depending on the distance from the operating terminal 2 corresponding to the specific group. The distance between the local device and an operating terminal 2 can be calculated by sending a wireless signal to the operating terminal 2 and measuring the time required for a response to be returned from the operating terminal 2. If the local device determines that the operating terminal 2 corresponding to a specific group is within a specific distance, then the group setting portion 13 of the operation controlling device 1 generates and stores in memory grouping setting information indicating that the facility equipment 4 connected locally is equipment belonging to that group.

Conversely, if the local device is within a range reached by a wireless signal from an operating terminal 2 corresponding to a specific group, then the group setting portion 13 generates and stores in memory grouping setting information indicating that the facility equipment 4 connected locally is equipment belonging to that group. In this way, the present example enables the facility equipment 4 to be grouped automatically.

A further example according to the present invention is explained next. FIG. 10 is a plan view illustrating the structure of an operation controlling system as set forth in this example. The operation controlling system according to this example, as with the above example, is structured from operation controlling devices 1 and operating terminals 2; however, the operation controlling devices 1 are categorized into master machines 1-1, of which only one exists in each group, and slave machines 1-2, which operate in accordance with the master machine 1-1. The master machine and the slave machines 1-2 communicate wirelessly with each other to achieve cooperative operation.

FIG. 11 is a block diagram illustrating a configuration of a master machine 1-1. The master machine 1-1 includes a wireless communicating portion 10; a facility equipment operation controlling portion 11, a facility equipment output controlling portion 12; a group setting portion 13; a notifying portion 14, and a human presence sensor 17 for detecting whether or not there is a person in the vicinity. The human presence sensor 17 may detect the presence of a person using, for example, infrared, ultrasonic, visible light, or the like. Moreover, even cases wherein a human is detected by a wireless tag carried on the person are also covered by the "human presence sensor 17".

The slave machines 1-2 are structured identically to the master machine 1-1, but use human presence sensors 17 that are inferior in sensitivity to that of the master machine 1-1. In this way, the master machine 1-1 uses a high sensitivity human presence sensor 17 that is expensive, and the slave machines 1-2 use low-cost human presence sensors 17 that are not particularly sensitive, making it possible to reduce the cost of the system as a whole.

The grouping of the facility equipment 4 may be through performing manual grouping, as explained above, or through performing automatic grouping, as also explained above. The master machine 1-1, as with the operation controlling device 1 explained in an example, turns the facility equipment 4 ON/OFF, or controls the output thereof, in accordance with instruction signals for the groups containing the facility equipment 4 connected locally.

Additionally, the master machine 1-1, depending on the detection result by the human presence sensor 17, turns the facility equipment 4 ON/OFF, controls the output thereof, or the like. For example, the facility equipment operating controlling portion 11 of the master machine 1-1 turns ON a stopped facility equipment 4 that is connected locally when the presence of a human is detected by the human presence sensor 17, and turns OFF the operating facility equipment 4 that is connected locally when the presence of a human is not detected by the human presence sensor 17. Conversely, the facility equipment output controlling portion 12 of the master machine 1-1 may reduce, by a specific amount, the output value of the facility equipment 4 connected locally when the presence of a human is not detected by the human presence sensor 17.

On the other hand, the slave machine 1-2 turns ON/OFF the facility equipment 4, or controls the output thereof, in accordance with an instruction signal to the group to which the facility equipment 4 connected locally belongs, or in response to a detection result by the human presence sensor 17, in the same manner as with the master machine 1-1. However, at this time the operation takes into account the operation of the master machine 1-1. That is, when the master machine 1-1 belonging to the same group turns ON/OFF the facility equipment 4, or controls the output thereof, then the slave machine 1-2, similarly, turns ON/OFF the facility equipment 4 connected locally, or controls the output thereof. The evaluation as to whether or not a machine belongs to the same group as a master machine 1-1 may be performed through communicating with the master machine 1-1 and comparing the grouping sating information set by the local group setting portion 13 to the group setting information set by the group setting portion 13 of the master machine 1-1. The reason for considering the operation of the master machine 1-1 in this way is because of the possibility of an incorrect detection by the human presence sensor 17, provided in the slave machine 1-2, that has poor sensitivity.

Note that the human presence sensor 17 may be added to the operation controlling devices 1 described in the above example. Doing so makes it possible to achieve control of the facility equipment 4 in accordance with the detection result of the human presence sensor 17 in both the above examples.

Yet another example of the present invention is explained next. In the present example, the configuration of the operation controlling system is identical to that in the above examples, and thus the explanation uses the same codes as in FIG. 1 through FIG. 3 and FIG. 11. In the present example, the resident or administrator is provided notification of the state of operation or the state of grouping of the facility equipment 4.

The notifying portion 14 of the operation controlling device 1 indicates the ON (operating)/OFF (stopped) status of the facility equipment 4, or the output value thereof. The expression of the output value may indicate the quantitative value of the air flow rate, or may be a grade level expression of the air flow rate, when, for example, the facility equipment 4 is an air conditioning supply air vent. In particular, in the case of an air conditioning supply air vent, or the like, it is hard to tell if operations are in process. However, by providing a display, through the notifying portion 14, the resident or administrator is able to confirm easily whether or not the facility equipment 4 is running.

FIG. 12 (A) and FIG. 12 (B) are flow charts illustrating the operations when checking the grouping status of facility equipment 4, where FIG. 12 (A) is a flowchart illustrating the operation of the operating terminal 2 and FIG. 12 (B) is a flowchart illustrating the operation of the operation controlling device 1. When a resident or an administrator wishes to check the grouping status of the facility equipment 4, he or she operates the operating portion 21 of the operating terminal 2 to request a grouping check. When there has been a request for a grouping check by a resident or an administrator (FIG. 12 (A), Step S400: YES), then the instruction signal generating portion 22 of the operating terminal 2 generates a grouping check instruction signal (Step S401). The grouping check instruction signal includes, for example, group identification information that specifies the group. The wireless communicating portion 20 of the operating terminal 2 sends wirelessly, to each operation controlling device 1, a grouping check instruction signal generated by the instruction signal generating portion 22 (Step S402).

The wireless communicating portion 10 of each operation controlling device 1, upon receipt of the grouping check instruction signal from the operating terminal 2 (FIG. 12 (B)

Step S403: YES), transfers the grouping check instruction signal to the notifying portion 14. If the grouping check instruction signal that has been received is a grouping check instruction signal to a group to which the facility equipment 4 that is connected locally belongs, then the notifying portion 14 senses that the signal is addressed to itself (Step S404: YES), and, for example, causes an LED to flash over a specific period of time (Step S405). In this way, in the present example, the LEDs of the operation controlling devices 1 belonging to the same group flash over the specific time interval, enabling the resident or the administrator to discern easily the state of grouping of the facility equipment 4.

While conventionally lighting or air-conditioning switches have been placed on walls, the correspondence relationship between the switches and the zones has been difficult to discover. In contrast, in the present example, the relationship between the operating terminal 2 and the group of facility equipment 4 corresponding thereto can be discerned easily.

An example according to the present invention is explained next. FIG. 13 (A) and FIG. 13 (B) are diagrams illustrating the configuration of an operation controlling device 1 according to an example of the present invention, wherein FIG. 13 (A) shows the state prior to the installation of an operation controlling device 1 into a lighting fixture 40, and FIG. 13 (B) shows the state wherein the operation controlling device 1 is installed in the lighting fixture 40. The operation controlling device 1 in the present example is provided with a socket 18 into which a fluorescent tube 47 can be installed, and a terminal 19 that is connected to a socket 46 of the lighting fixture 40.

When the terminal 19 of the operation controlling device 1 is connected to the socket 46 of the lighting fixture 40, to install the operation controlling device 1 in the lighting fixture 40, the fluorescent tube 47 is connected to the lighting fixture 40 through the socket 18 and the terminal 19. The operation controlling device 1 operates by receiving a power supply from the socket 46 of the lighting fixture 40. The interior structure of the operation controlling device 1 is as illustrated in FIG. 2 and FIG. 11. In this way, in the present example, the socket 46 in the existing lighting fixture 40 is used to enable the operation controlling device 1 to be added to the lighting fixture 40.

FIG. 14 (A) and FIG. 14 (B) are diagrams illustrating another configuration of an operation controlling device 1 according to an example of the present invention, wherein FIG. 14 (A) shows the state prior to the installation of an operation controlling device 1 into a lighting fixture 40, and FIG. 14 (B) shows the state wherein the operation controlling device 1 is installed in the lighting fixture 40. The operation controlling device 1 in the present form of embodiment is provided with a socket 50 into which a fluorescent tube 48 can be installed, and a terminal 51 that is connected to a socket 46 of the lighting fixture 40.

In the example in FIG. 14 (A) and FIG. 14 (B), a fluorescent tube 48 is used that is shorter than the fluorescent tube 47. One end of the fluorescent tube 48 is installed in the socket 50 of the operation controlling device 1, and the other end of the fluorescent tube 48 and the terminal 51 of the operation controlling device 1 are installed in the socket 46 of the lighting fixture 40. Doing so enables the socket 46 of an existing lighting fixture 40 to be used, in the same manner as described above, to enable the addition of the operation controlling device 1 to the lighting fixture 40.

While fluorescent tubes have been used as examples of lighting fixtures in the examples above, there is no limitation thereto, and, of course, other tight-emitting devices, such as light bulbs or LEDs, or the like, may be used. Additionally, while in the above examples both the facility equipment operation controlling portion 11 and the facility equipment output controlling portion 12 have been provided in the operation controlling device 1 instead either the facility equipment operation controlling portion 11 or the facility equipment output controlling portion 12 may be provided to either turn the facility equipment ON/OFF or to control the output thereof.

Furthermore, while in the above examples a method was used wherein identification numbers of the facility equipment 4 were specified when performing grouping, this method need not necessarily be used. For example, the selection may be made through directing highly directional radiation at the facility equipment 4 from the operating terminal 2, to specify whether or not there is to be inclusion within the specific group. Moreover, in the examples, operations, such as turning ON/OFF, were performed by specifying an identification number of a group to be operated. This improved the convenience by enabling the operation of a plurality of groups from a single operating terminal 2. However, there is no limitation to this method. Instead, there may be a 1-to-1 correspondence between the operating terminals 2 and the groups, eliminating the need to specify the group identification number.

Each of the operation controlling devices 1 and operating terminals 2 in the examples can be embodied through a computer having a CPU, a memory device, and an external interface, and through a program for controlling these hardware resources. The CPU of each device performs the processes explained in the examples in accordance with a program stored in the memory device.

The present invention can be applied to technologies for controlling the operation of facility equipment.

The invention claimed is:

1. An operation controlling system comprising:
    an operation controlling device configured to be removably installable in a facility equipment; and
    a user-operated terminal sending an instruction signal to the operation controlling device;
    wherein the operation controlling device comprises:
        a communicating device receiving the instruction signal sent from the user-operated terminal;
        either or both
        an operation controller turning ON/OFF, in accordance with the instruction signal, the facility equipment that is connected locally, and
        an output controller controlling, in accordance with the instruction signal, an output value of the facility equipment that is connected locally; and
        a group setting device grouping the facility equipment with another facility equipment provided with another operation controlling device to set a group either in accordance with an instruction signal from the user-operated terminal or in accordance with a distance from the user-operated terminal,
    wherein the operation controller or the output controller controls the facility equipment that is connected locally when an instruction signal for the group that includes the facility equipment that is connected locally is received.

2. The operation controlling system as set forth in claim 1, wherein:
    the operation controlling device further comprises a human presence detecting sensor detecting the presence of a human; and
    the operation controller or the output controller controls, in accordance with a detection result of the human presence sensor, the facility equipment that is connected locally.

3. The operation controlling system as set forth in claim 1, wherein:
the operation controlling device further comprises a notifier providing notification of an operating status of the facility equipment and/or a grouping status of the facility equipment.

4. The operation controlling system as set forth in claim 1, wherein:
the facility equipment is a lighting fixture; and
the operation controlling device further comprises a socket into which a light-emitting device is configured to be removably installable, and a terminal that is configured to be removably connectable to a socket of the lighting fixture when installed in the lighting fixture.

5. An operation controlling device that is configured to be removably installable in a facility equipment, comprising:
a communicator receiving an instruction signal sent from a user-operated terminal;
either or both
an operation controller turning ON/OFF, in accordance with the instruction signal, the facility equipment that is connected locally, and
an output controller controlling, in accordance with the instruction signal, an output value of the facility equipment that is connected locally; and
a group setting device grouping facility equipment either in accordance with an instruction signal from the operating terminal or in accordance with a distance from the operating terminal,
wherein the operation controller or the output controller controls the facility equipment that is connected locally when an instruction signal for a group that includes the facility equipment that is connected locally is received.

6. The operation controlling device as set forth in claim 5, further comprising:
a human presence detecting sensor for detecting the presence of a human; wherein
the operation controller or the output controller controls, in accordance with a detection result of the human presence sensor, the facility equipment that is connected locally.

7. The operation controlling device as set forth in claim 5, further comprising:
a notifying device providing notification of an operating status of the facility equipment and/or a grouping status of the facility equipment.

8. The operation controlling device as set forth in claim 5, wherein, when the facility equipment is a lighting fixture, the operation controlling device further comprises:
a socket into which a light-emitting device is configured to be removably installable, and a terminal that is configured to be removably connectable to a socket of the lighting fixture when installed in the lighting fixture.

9. An operation controlling method, comprising:
removably installing an operation controlling device into a facility equipment;
receiving, at the operation controlling device, an instruction signal sent from a user-operated terminal;
at least one of
turning, using the operation controlling device, ON/OFF, in accordance with the instruction signal, the facility equipment that is connected locally, and
controlling, with the operation controlling device, in accordance with the instruction signal, an output value of the facility equipment that is connected locally; and
grouping, using the operation controlling device, the facility equipment with another facility equipment provided with another operation controlling device to set a group either in accordance with an instruction signal from the user-operated terminal or in accordance with a distance from the user-operated terminal,
wherein the operation controlling device turns ON/OFF or controls the output value of the facility equipment that is connected locally when an instruction signal for the group that includes the facility equipment that is connected locally is received.

10. The operation controlling system as set forth in claim 1, wherein:
the group setting device of the operation controlling device groups the facility equipment with the another facility equipment provided with the another operation controlling device to set the group in accordance with the distance from the user-operated terminal.

* * * * *